US008882255B2

(12) United States Patent
Nakazawa et al.

(10) Patent No.: US 8,882,255 B2
(45) Date of Patent: Nov. 11, 2014

(54) INK JET INK AND INK JET RECORDING METHOD

(75) Inventors: Ikuo Nakazawa, Kawasaki (JP); Masayuki Ikegami, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 390 days.

(21) Appl. No.: 13/473,841

(22) Filed: May 17, 2012

(65) Prior Publication Data
US 2012/0313997 A1 Dec. 13, 2012

(30) Foreign Application Priority Data
Jun. 10, 2011 (JP) ................................ 2011-130501

(51) Int. Cl.
C09D 11/00 (2014.01)
C09D 11/106 (2014.01)
C09D 11/322 (2014.01)

(52) U.S. Cl.
CPC ............ C09D 11/106 (2013.01); C09D 11/322 (2013.01)
USPC ........................................................ 347/100

(58) Field of Classification Search
USPC ........................................................ 347/100
See application file for complete search history.

(56) References Cited

U.S. PATENT DOCUMENTS

| | | | |
|---|---|---|---|
| 5,851,280 A | 12/1998 | Belmont et al. | |
| 6,916,861 B2 * | 7/2005 | Nomoto et al. | 523/160 |
| 7,004,579 B2 | 2/2006 | Sato et al. | |
| 7,056,972 B2 | 6/2006 | Nakazawa et al. | |
| 7,067,590 B2 | 6/2006 | Sato et al. | |
| 7,151,156 B2 | 12/2006 | Sato et al. | |
| 7,328,991 B2 | 2/2008 | Sato et al. | |
| 7,423,075 B2 | 9/2008 | Ikegami et al. | |
| 7,439,282 B2 | 10/2008 | Sato et al. | |
| 7,442,753 B2 | 10/2008 | Tsubaki et al. | |
| 7,449,513 B2 | 11/2008 | Sato et al. | |
| 7,498,364 B2 | 3/2009 | Sato et al. | |
| 7,528,179 B2 | 5/2009 | Suda et al. | |
| 7,538,147 B2 | 5/2009 | Sato et al. | |
| 7,563,853 B2 | 7/2009 | Tsubaki et al. | |
| 7,572,844 B2 | 8/2009 | Sato et al. | |
| 7,598,332 B2 | 10/2009 | Ikegami et al. | |
| 7,601,790 B2 | 10/2009 | Sato et al. | |
| 7,629,427 B2 | 12/2009 | Sato et al. | |
| 7,704,414 B2 | 4/2010 | Sato et al. | |
| 7,866,806 B2 | 1/2011 | Sato et al. | |
| 7,972,428 B2 | 7/2011 | Nick et al. | |
| 8,075,123 B2 * | 12/2011 | Umebayashi | 347/100 |
| 8,147,053 B2 * | 4/2012 | Kawakami et al. | 347/100 |
| 8,613,510 B2 * | 12/2013 | Wachi | 347/100 |
| 8,690,307 B2 * | 4/2014 | Okumura et al. | 347/100 |
| 2005/0034629 A1 | 2/2005 | Belmont et al. | |
| 2007/0100024 A1 | 5/2007 | Gu et al. | |
| 2009/0311425 A1 | 12/2009 | Tsubaki et al. | |
| 2011/0227976 A1 | 9/2011 | Koike et al. | |

FOREIGN PATENT DOCUMENTS

| | | | |
|---|---|---|---|
| JP | 2004-149600 A | 5/2004 | |
| JP | 3808504 B2 | 8/2006 | |
| JP | 2009-506196 A | 2/2009 | |
| JP | 2009-515007 A | 4/2009 | |
| WO | 2007/027625 A2 | 3/2007 | |
| WO | 2007/053563 A2 | 5/2007 | |
| WO | 2009/014242 A1 | 1/2009 | |

* cited by examiner

Primary Examiner — Laura Martin
(74) Attorney, Agent, or Firm — Fitzpatrick, Cella, Harper & Scinto

(57) ABSTRACT

The invention provides an ink jet ink including a coloring material, a polymer particle, a crosslinking agent and an aqueous medium. The polymer particle has a unit derived from a compound represented by the following general formula (1) and a glass transition temperature of 25° C. or less. The crosslinking agent has a functional group capable of forming a crosslinked structure with a ketone group derived from the compound represented by the general formula (1) by a dehydration reaction. The mass ratio of a content (% by mass) of the coloring material based on the total mass of the ink to a content (% by mass) of the polymer particle based on the total mass of the ink is 0.2 times or more and 2.5 times or less.

General formula (1)

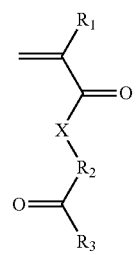

7 Claims, No Drawings

INK JET INK AND INK JET RECORDING METHOD

BACKGROUND OF THE INVENTION

1. Field of the Invention

The present invention relates to an ink jet ink and an ink jet recording method using such an ink.

2. Description of the Related Art

An ink containing a polymer particle is known as an ink jet ink. Japanese Patent Application Laid-Open No. 2004-149600 proposes an ink jet ink containing a crosslinkable polymer particle.

SUMMARY OF THE INVENTION

However, the ink jet ink described in Japanese Patent Application Laid-Open No. 2004-149600 have been unable to satisfy all the following requirements (1) to (3):
(1) the ejection stability of the ink is high;
(2) the blurring of a resulting image is sufficiently reduced; and
(3) the scratch resistance and water resistance of a resulting image is good.

Accordingly, it is an object of the present invention to provide an ink jet ink that has high ejection stability and reduced blurring and can provide an image with high scratch resistance and water resistance. Another object of the present invention is to provide an ink jet recording method using the above-described ink according to the present invention.

The above objects can be achieved by the present invention described below. That is, the present invention provides an ink jet ink comprising a coloring material, a polymer particle, a crosslinking agent and an aqueous medium, wherein the polymer particle has a unit derived from a compound represented by the following general formula (1) and a glass transition temperature of 25° C. or less, the crosslinking agent has a functional group capable of forming a crosslinked structure with a ketone group derived from the compound represented by the general formula (1) by a dehydration reaction, and a mass ratio of a content (% by mass) of the coloring material based on the total mass of the ink to a content (% by mass) of the polymer particle based on the total mass of the ink is 0.2 times or more and 2.5 times or less.

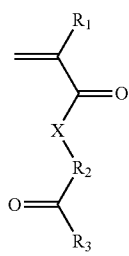

General formula (1)

wherein $R_1$ is H or $CH_3$, X is O or NH, $R_2$ is an alkylene group having 1 to 10 carbon atoms or an aromatic ring structure having 1 to 10 carbon atoms, and $R_3$ is an alkyl group having 1 to 10 carbon atoms or an aromatic ring structure having 1 to 10 carbon atoms.

According to the present invention, there can be provided an ink jet ink that has high ejection stability and reduced blurring and can provide an image with high scratch resistance and water resistance. According to another embodiment of the present invention, there can be provided an ink jet recording method using the above-described ink.

Further features of the present invention will become apparent from the following description of exemplary embodiments.

DESCRIPTION OF THE EMBODIMENTS

Preferred embodiments of the present invention will now be described in detail.

The ink jet ink (hereinafter also referred to as "ink" merely) according to the present invention contains a coloring material, a polymer particle, an aqueous medium and a crosslinking agent. The present invention will hereinafter be described in more detail by preferred embodiments.

Ink:

Coloring Material

No particular limitation is imposed on the kind of the coloring material contained in the ink, and any of the publicly known dyes and pigments may be suitably used. A pigment is favorably used as the coloring material from the viewpoint of the water resistance of a resulting image. A self-dispersible pigment among the pigment is favorably used from the viewpoint of the color developability of an image, and an anionic self-dispersible pigment is more favorably used.

The anionic self-dispersible pigment means a pigment dispersed and stabilized by introducing an anionic functional group into the surface of the pigment directly or through another atomic group. As a pigment before being dispersed and stabilized, may be used any of such conventionally known various pigments as mentioned in, for example, International Publication No. WO2009/014242. Incidentally, the anionic functional group means such a functional group that half or more of hydrogen ions dissociate at a pH of 7.0. As specific examples of the anionic functional group, may be mentioned a carboxyl group, a sulfo group and a phosphonic group. Among these, the carboxyl group or sulfo group is favorable from the viewpoint of enhancing the optical density of a resulting image.

As an example of a method for introducing the anionic functional group into the surface of the pigment, may be mentioned a method of subjecting carbon black to an oxidation treatment. As a specific example of the oxidation treatment method, may be mentioned a method of conducting treatment with a hypochlorite, aqueous ozone, hydrogen peroxide or nitric acid. Self-dispersible carbon black obtained by a surface treatment method using sodium hypochlorite is favorable as the anionic self-dispersible pigment from the viewpoint of enhancing the optical density of the resulting image. As another oxidation treatment method, may be mentioned such a surface treatment method using a diazonium salt as described in, for example, Japanese Patent No. 3808504, Japanese Publication of PCT Application No. 2009-515007 and Japanese Publication of PCT Application No. 2009-506196. As examples of a commercially available pigment into the surface of which a hydrophilic group has been introduced, may be mentioned CW-1, CW-2 and CW-3 (all, products of Orient Chemical Industries Ltd.) and CAB-O-JET200, CAB-O-JET300 and CAB-O-JET400 (all, products of Cabot Company).

The average particle size of the anionic self-dispersible pigment as determined by a dynamic light scattering method is favorably 60 nm or more, more favorably 70 nm or more, particularly favorably 75 nm or more. The average particle size of the anionic self-dispersible pigment is favorably 145 nm or less, more favorably 140 nm or less, particularly favorably 130 nm or less. The average particle size of the anionic self-dispersible pigment can be measured by, for example, using an instrument such as FPAR-1000 (manufactured by Otsuka Electronics Co., Ltd., cumulant analysis) or Nanotrac UPA 150EX (manufactured by NIKKISO CO., LTD.; measured as a 50% cumulative value) utilizing scattering of laser beam. Incidentally, the term "average particle size" in the present specification means "scattering average particle size".

The content of the coloring material is favorably 0.5% by mass or more, more favorably 1.0% by mass or more, particularly favorably 2.0% by mass or more, based on the total mass of the ink. The content of the coloring material is favorably 15.0% by mass or less, more favorably 10.0% by mass or less, particularly favorably 8.0% by mass or less.

Polymer Particle

The polymer particle contained in the ink according to the present invention has a unit derived from a compound represented by the following general formula (1). That is, the polymer particle is obtained by polymerizing a compound represented by the following general formula (1). Incidentally, the polymer particle may also be a copolymer with "another monomer" than the compound represented by the following general formula (1). Said "another monomer" will be described subsequently. The compound represented by the following general formula (1) has a ketone group. Accordingly, the polymer particle having the unit derived by the compound represented by the following general formula (1) also has the ketone group (hereinafter also referred to as "ketone group of polymer particles") derived from the compound represented by the general formula (1) in its structure.

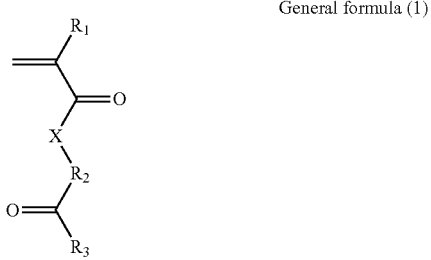

General formula (1)

wherein $R_1$ is H or $CH_3$, X is O or NH, $R_2$ is a substituted or unsubstituted alkylene group having 1 to 10 carbon atoms or a substituted or unsubstituted aromatic ring structure having 1 to 10 carbon atoms, and $R_3$ is a substituted or unsubstituted alkyl group having 1 to 10 carbon atoms or a substituted or unsubstituted aromatic ring structure having 1 to 10 carbon atoms.

The compound represented by the general formula (I) will hereinafter be specifically exemplified. Incidentally, "Ph" in the following chemical formula indicates a phenyl group or phenylene group. In addition, "Cycrohex" indicates a cyclohexyl group or cyclohexylene group. $CH_2=CH-CO-NH-C(CH_3)_2-CH_2-CO-CH_3CH_2=C(CH_3)-CO-NH-C(CH_3)_2-CH_2-CO-CH_3CH_2=CH-CO-NH-C(CH_3)_2-CH_2-CO-C_2H_5CH_2=C(CH_3)-CO-NH-C(CH_3)_2-CH_2-CO-C_2H_5CH_2=CH-CO-NH-C(CH_3)_2-CH_2-CO-C_3H_7CH_2=C(CH_3)-CO-NH-C(CH_3)_2-CH_2-CO-C_3H_7CH_2=CH-CO-NH-C(CH_3)_2-CH_2-CO-C_4H_9CH_2=C(CH_3)-CO-NH-C(CH_3)_2-CH_2-CO-C_6H_{13}CH_2=CH-CO-NH-C(CH_3)_2-CH_2-CO-C_5H_{11}CH_2=C(CH_3)-CO-NH-C(CH_3)_2-CH_2-CO-C_7H_{15}CH_2=CH-CO-NH-C(CH_3)_2-CH_2-CO-C_8H_{17}CH_2=C(CH_3)-CO-NH-C(CH_3)_2-CH_2-CO-C_9H_{19}CH_2=C(CH_3)-CO-NH-C(CH_3)_2-CH_2-CO-C_{10}H_{21}CH_2=CH-CO-NH-C(CH_3)_2-CH_2-CO-CH(CH_3)$ $CH_3CH_2=C(CH_3)-CO-NH-C(CH_3)_2-CH_2-CO-CH(CH_3)$ $CH_3CH_2=CH-CO-NH-C(CH_3)_2-CH_2-CO-C(CH_3)_3CH_2=C(CH_3)-CO-NH-C(CH_3)_2-CH_2-CO-C(CH_3)_3CH_2=CH-CO-NH-C(CH_3)_2-CH_2-CO-CH_2CH(CH_3)_2CH_2=C(CH_3)-CO-NH-C(CH_3)_2-CH_2-CO-CH_2CH(CH_3)_2CH_2=CH-CO-NH-C(CH_3)_2-CH_2-CO-CycrohexCH_2=C(CH_3)-CO-NH-C(CH_3)_2-CH_2-CO-CycrohexCH_2=CH-CO-O-C(CH_3)_2-CH_2-CO-CH_3CH_2=C(CH_3)-CO-O-C(CH_3)_2-CH_2-CO-CH_3CH_2=CH-CO-NH-CH_2-CH_2-CO-CH_3CH_2=C(CH_3)-CO-NH-CH_2-CH_2-CO-CH_3CH_2=CH-CO-NH-C(CH_3)_2-CH_2-CH_2-CO-CH_3CH_2=C(CH_3)-CO-NH-C(CH_3)_2-CH_2-CH_2-CO-CH_3CH_2=CH-CO-NH-C(CH_3)_2-CH_2-CH_2-CH_2-CO-CH_3CH_2=C(CH_3)-CO-NH-C(CH_3)_2-CH_2-CH_2-CH_2-CO-CH_3CH_2=CH-CO-NH-Ph-CH_2-CH_2-CO-CH_3CH_2=C(CH_3)-CO-NH-C(CH_3)_2-Ph-CH_2-CH_2-CO-CH_3CH_2=CH-CO-NH-Ph-C(CH_3)_2-CH_2-CO-CH_3CH_2=C(CH_3)-CO-NH-Ph-C(CH_3)_2-CH_2-CO-CH_3CH_2=CH-CO-NH-Ph-C(CH_3)_2-CH_2-CO-CH_3CH_2=C(CH_3)-CO-NH-Ph-C(CH_3)_2-CH_2-CO-CH_3CH_2=CH-CO-NH-Cycrohex-C(CH_3)_2-CH_2-CO-CH_3CH_2=C(CH_3)-CO-NH-Cycrohex-C(CH_3)_2-CH_2-CO-CH_3$.

As described above, the polymer particle may also be a copolymer of the compound represented by the general formula (1) and "another monomer". In the present invention, a hydrophobic monomer, acidic monomer or nonionic monomer may be mentioned as "another monomer". As specific examples of the hydrophobic monomer, may be mentioned styrene, α-methylstyrene, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, 2-ethylhexyl acrylate, 2-ethylhexyl methacrylate, 3-methylbutyl acrylate, 3-methylbutyl methacrylate, heptyl acrylate, heptyl methacrylate, benzyl acrylate and benzyl methacrylate.

As specific examples of the acidic monomer, may be mentioned acrylic acid, methacrylic acid, itaconic acid, fumaric acid and maleic acid. Incidentally, a hydrophilic monomer having a sulfonic structure may also be used as "another monomer". As specific examples of such a hydrophilic monomer, may be mentioned 3-sulfopropyl (meth)acrylate, vinylstyrenesulfonic acid and 2-acrylamido-2-methylpropanesulfonic acid. As specific examples of the nonionic monomer, may be mentioned N-vinylpyrrolidone, 2-hydroxyethyl acrylate, 2-hydroxypropyl acrylate, 4-hydroxybutyl acrylate and 4-hydroxyethyl methacrylate.

The content of the polymer particle is favorably 0.1% by mass or more and 20% by mass or less, more favorably 0.5% by mass or more and 10.0% by mass or less based on the total mass of the ink. If the content of the polymer particle is less than 0.1% by mass, the effect to improve the scratch resistance and water resistance of a resulting image may not be sufficiently achieved in some cases. If the content of the polymer particle exceeds 20.0% by mass on the other hand, the viscosity of such an ink becomes high, and so the effect to improve the ejection stability of the ink may not be sufficiently achieved in some cases.

The glass transition temperature of the polymer particle is required to be 25° C. or less. The glass transition temperature of the polymer particle is a physical property value indicating the softness of a polymer particle. In the present invention, such a soft polymer particle that the glass transition temperature is 25° C. or less is used, whereby such polymer particles can fusion-bond to each other to form a continuous film when the ink is applied to a recording medium, thereby improving the scratch resistance and water resistance of the resulting image. Such a polymer particle is particularly favorable because the fusion bonding of the polymer particles particularly markedly occurs when used at room temperature (25° C.). In the present invention, the glass transition temperature of the polymer particle is favorably −15° C. or more and 20° C. or less, more favorably −10° C. or more and 15° C. or less. Incidentally, the glass transition temperature (Tg) of a polymer forming the polymer particle can be measured by an ordinary method using a thermal analyzer such as, for example, a differential scanning calorimeter (DSC).

The mass ratio of the content (% by mass) of the coloring material based on the total mass of the ink to the content (% by mass) of the polymer particle based on the total mass of the ink is 0.2 times or more and 2.5 times or less, more favorably 0.2 times or more and 1.8 times or less, particularly favorably 0.5 times or more and 1.2 times or less. The mass ratio between the polymer particle and the coloring material contained in the ink is controlled within the above range, whereby the ejection stability and the scratch resistance and water resistance of a resulting image can be improved. If the mass ratio is less than 0.2 times, the effect to improve the ejection stability of the ink may not be sufficiently improved in some cases. If the mass ratio exceeds 2.5 times, the effect to improve the scratch resistance and water resistance of a resulting image may not be sufficiently improved in some cases.

Synthesis Example of Polymer Particle

No particular limitation is imposed on a process for obtaining the polymer particle by polymerizing the compound represented by the general formula (1). However, the polymer particle is favorably obtained by emulsion polymerization or soap-free polymerization. A specific synthesis example of the polymer particle will now be described.

A predetermined amount of a monomer containing a compound represented by the general formula (1) and 100 g of distilled water that is a solvent are added into a 300-mL four-necked flask. An agitation seal, a stirring rod, a reflux condenser, a rubber septum and a nitrogen inlet tube are installed in the flask, and the flask is purged with nitrogen for 1 hour while stirring at 300 rpm in a thermostatic chamber of 70° C. A polymerization initiator dissolved in 100 g of distilled water is then injected into the flask by a syringe to start polymerization. The state of the polymerization is monitored by gel permeation chromatography (GPC) and nuclear magnetic resonance spectrometry (NMR) to form a desired polymer particle that is a polymerization reaction product. The polymer particle formed is centrifugally separated and dispersed in distilled water again, and this process is repeated, thereby purifying the polymer particle in a state of an aqueous dispersion. The aqueous dispersion of the polymer particle may be concentrated by an evaporator or through ultrafiltration as needed.

As the polymerization initiator, may be used potassium persulfate or 2,2'-azobis(2-amidinopropane) dihydrochloride. In addition to the polymerization initiator, an emulsifier, a chain-transfer agent and a neutralizing agent may also be added. As specific examples of the emulsifier, may be mentioned anionic surfactants such as sodium lauryl sulfate; nonionic surfactants; and amphoteric surfactants. As specific examples of the chain-transfer agent, may be mentioned t-dodecylmercaptan; n-dodecylmercaptan; n-octylmercaptan; xanthogens such as dimethylxanthogen disulfide and diisobutylxanthogen disulfide; dipentene; indene; 1,4-cyclohexadiene; dihydrofuran; and xanthene. As specific examples of the neutralizing agent, may be mentioned ammonia; and inorganic alkali hydroxides such as sodium hydroxide and potassium hydroxide.

Crosslinking Agent

The crosslinking agent contained in the ink according to the present invention has a functional group capable of forming a crosslinked structure with a ketone group of the polymer particle by a dehydration reaction. Specifically, the dehydration reaction is caused to proceed in the following manner.

In the ink, the polymer particle having the ketone group and the crosslinking agent undergo an equilibrium reaction as shown in the following reaction formula (I). Incidentally, the following reaction formula (I) shows the case where adipic dihydrazide is used as the crosslinking agent. However, the crosslinking agent is not limited thereto. In the following reaction formula (I), the polymer particle is represented by a repeating structure of $CH_2=CH-CO-NH-CH_2-CO-CH_3$, which is a sort of the compound represented by the general formula (1). However, the polymer particle is not limited thereto.

Reaction formula (I)

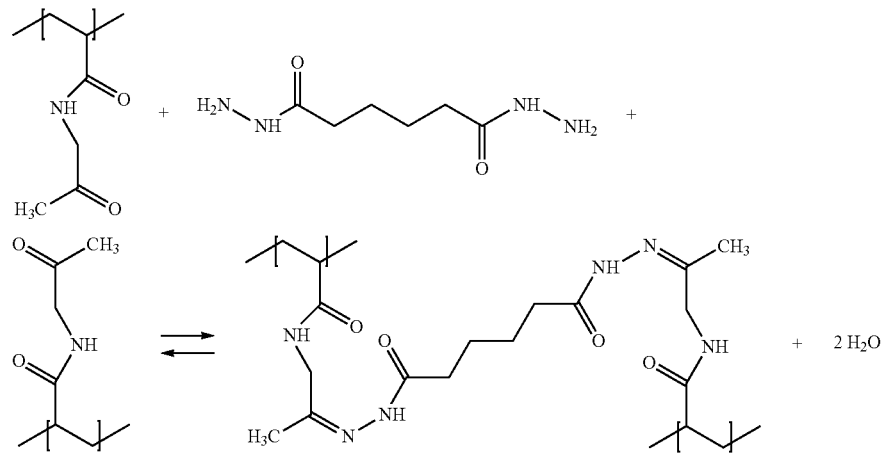

As apparent from the reaction formula (I), water is present in the ink, so that the equilibrium reaction proceeds as a reverse reaction (the reaction toward the left). Accordingly, the polymer particle and the crosslinking agent can be stably present without undergoing the crosslinking reaction, so that the ejection stability of the ink is very high. On the other hand, when the ink is applied to a recording medium, water is rapidly lost from the interior of the system by evaporation, so that the equilibrium reaction proceeds as a forward reaction (the reaction toward the right) and becomes an irreversible reaction, and so a crosslinked structure between polymer particles is formed. As a result, a continuous film formed by fusion bonding of the polymer particles by the crosslinking becomes strong, so that high scratch resistance and water resistance are achieved in the resulting image. As have been described above, such materials as to cause no crosslinking reaction in the ink but to cause crosslinking reaction when the ink is applied to a recording medium (a polymer particle having a ketone group and a crosslinking agent) are used in combination in the present invention, whereby the effects of the present invention are achieved.

In the present invention, the crosslinked structure is formed without applying external energy such as heat or electron beam as described above. However, it is also possible to accelerate the dehydration reaction by applying external energy to promote the formation of the crosslinked structure. However, the crosslinked structure is favorably formed by the dehydration reaction without positively applying external energy from the viewpoint of energy saving.

The functional group of the crosslinking agent to form the crosslinked structure with the ketone group of the polymer particle is favorably at least one selected from a hydrazide group and a semicarbazide group. When a crosslinking agent having these functional groups is used, such an equilibrium reaction as shown in the reaction formula (I) efficiently occurs, and the crosslinked structure is easy to be formed. In particular, the crosslinking agent favorably has two or more hydrazide groups and semicarbazide groups because the crosslinked structure can be efficiently formed.

Chemical formulae of compounds suitably usable as the crosslinking agent will now be specifically exemplified. $H_2N-NH-CO-(CH_2)_4-CO-NH-NH_2H_2N-NH-CO-(CH_2)_5-CO-NH-NH_2H_2N-NH-CO-(CH_2)_6-CO-NH-NH_2H_2N-NH-CO-(CH_2)_7-CO-NH-NH_2H_2N-NH-CO-(CH_2)_8-CO-NH-NH_2H_2N-NH-CO-(CH_2)_9-CO-NH-NH_2H_2N-NH-CO-(CH_2)_{10}-CO-NH-NH_2H_2N-NH-CO-(CH_2)_{11}-CO-NH-NH_2H_2N-NH-OC-(CH_2)_{12}-CO-NH-NH_2H_2N-NH-CO-(CH_2)_{13}-CO-NH-NH_2H_2N-NH-CO-(CH_2)_{14}-CO-NH-NH_2H_2N-NH-CONH-(CH_2)_4-NHCO-NH-NH_2H_2N-NH-CONH-(CH_2)_5-NHCO-NH-NH_2H_2N-NH-CONH-(CH_2)_6-NHCO-NH-NH_2H_2N-NH-CONH-(CH_2)_7-NHCO-NH-NH_2H_2N-NH-CONH-(CH_2)_8-NHCO-NH-NH_2H_2N-NH-CONH-(CH_2)_9-NHCO-NH-NH_2H_2N-NH-CONH-(CH_2)_{10}-NHCO-NH-NH_2H_2N-NH-CONH-(CH_2)_{11}-NHCO-NH-NH_2H_2N-NH-CONH-(CH_2)_{12}-NHCO-NH-NH_2H_2N-NH-CONH-(CH_2)_{13}-NHCO-NH-NH_2H_2N-NH-CONH-(CH_2)_{14}-NHCO-NH-NH_2H_2N-NH-CO-Ph-CO-NH-NH_2H_2N-NH-CONH-Ph-NHCO-NH-NH_2$.

As examples of other crosslinking agents than the crosslinking agents represented by the chemical formulae exemplified above, may be mentioned an acrylic acid hydrazide polymer and acrylic acid hydrazide copolymers obtained by copolymerizing two or more monomers including acrylic acid hydrazide. Incidentally, the acrylic acid hydrazide polymer (polyacrylic acid hydrazide) can be synthesized by, for example, (a) reacting polyacrylamide and hydrazine monohydrate. The polymer may also be synthesized by (b) polymerizing a monomer obtained by subjecting acrylic acid chloride and hydrazine monohydrate to an acylation reaction. (acrylic acid hydrazide)

In the present invention, the number of the functional groups of the crosslinking agent to form the crosslinked structure is favorably 0.1 or more and less than 2.0, more favorably 0.2 or more and less than 1.5, per one ketone group of the polymer particle. If the number of the functional groups of the crosslinking agent to form the crosslinked structure is outside (less than 0.1 and 2.0 or more) the above range, the crosslinking reaction is hard to occur, so that the effect to improve the scratch resistance and water resistance of a resulting image may not be sufficiently achieved in some cases. Incidentally, the number of the ketone groups of the polymer particle and the number of the functional groups of the crosslinking agent to form the crosslinked structure can be measured by NMR, so that the respective numbers may be measured to calculate the number of the functional groups of the crosslinking agent to form the crosslinked structure per one ketone group of the polymer particle.

Aqueous Medium

The ink according to the present invention contains an aqueous medium. This aqueous medium may be either water alone or a mixed solvent of water and a water-soluble organic compound. The content of water is favorably 30% by mass or more and 95% by mass or less based on the total mass of the ink. Incidentally, the term "water-soluble organic compound" in the present invention means an organic compound whose solubility in water is 20% by mass or more. Incidentally, the water-soluble organic compound favorably has a vapor pressure of 0.04 mmHg or less at 20° C. from the viewpoint of the ejection stability of the ink. The content of the water-soluble organic compound is favorably 5.0% by mass or more, more favorably 6.0% by mass or more, particularly favorably 7.0% by mass or more, based on the total mass of the ink. The content of the water-soluble organic compound is favorably 40.0% by mass or less, more favorably 35.0% by mass or less, particularly favorably 30.0% by mass or less.

According to the investigation by the present inventors, it has been found that the crosslinking reaction between the polymer particle and the crosslinking agent may be promoted in some cases according to the kind of the water-soluble organic compound. As described above, the crosslinking reaction in the present invention is caused to proceed by evaporation of water when the ink is applied to a recording medium. That is, such a water-soluble organic compound as to promote the evaporation of water is favorably used. Thus, the present inventors have carried out an investigation. As a result, it has been found that a coefficient of hydrophilicity-hydrophobicity defined by the following equation (A) is used, whereby the ability to promote the evaporation of water that a certain water-soluble organic compound has can be evaluated. This will now be described in detail.

Coefficient of hydrophilicity-hydrophobicity=[(Water activity of a 20% aqueous solution)−(Molar fraction of water in the 20% aqueous solution)]/[1−(Molar fraction of water in the 20% aqueous solution)]  Equation (A)

In the equation (A), "water activity" is a physical property value represented by the equation of "Water activity"=(Water vapor pressure of an aqueous solution)/(water vapor pressure of pure water) and is a value indicating the affinity of a water-soluble organic compound for water. That is, the lower the water activity, the higher the affinity for water. Incidentally, this "water activity" can be measured by a chilled mirror dew point measuring method. In the present invention, "Aqua-Love CX-3TE" (manufactured by DECAGON CO.), which is an instrument for calculating the water activity by the chilled mirror dew point measuring method was used to measure the water activity of an aqueous solution containing 20% by mass of the water-soluble organic compound at 25° C. Incidentally, the water activity of an aqueous solution does not exceed 1, so that the maximum value of the coefficient of hydrophilicity-hydrophobicity is 1. Accordingly, the larger the coefficient of hydrophilicity-hydrophobicity, the lower the affinity for water, so that the evaporation of water is not inhibited, and so such a water-soluble organic compound can be considered to have the ability to promote the evaporation of water. The present inventors have measured the coefficients of hydrophilicity-hydrophobicity of various water-soluble organic solvents to study the effect to promote the crosslinking reaction. As a result, it has been found that a water-soluble organic compound having a coefficient of hydrophilicity-hydrophobicity of 0.26 or more is favorably used. It is more favorable to contain a water-soluble organic compound having a coefficient of hydrophilicity-hydrophobicity of 0.26 or more and less than 0.37 and a water-soluble organic compound having a coefficient of hydrophilicity-hydrophobicity of 0.37 or more in ink. It is further favorable to contain two or more water-soluble organic compounds having a coefficient of hydrophilicity-hydrophobicity of 0.37 or more in ink. When two or more water-soluble organic compounds having a coefficient of hydrophilicity-hydrophobicity of 0.37 or more are contained in ink, a difference in the coefficient of hydrophilicity-hydrophobicity between the respective water-soluble organic compounds is favorably 0.1 or more.

The coefficients of hydrophilicity-hydrophobicity of representative water-soluble organic compounds, which are calculated out from the equation (A), are shown in Table 1. However, in the present invention, the water-soluble organic compounds are not limited to the water-soluble organic solvents shown in Table 1.

TABLE 1

| Material name | Coefficient of hydrophilicity-hydrophobicity |
|---|---|
| 1,2-Hexanediol | 0.97 |
| 1,2-Pentanediol | 0.93 |
| 3-Methyl-1,3-butanediol | 0.90 |
| 1,2-Butanediol | 0.90 |
| 2,4-Pentanediol | 0.88 |
| 1,6-Hexanediol | 0.76 |
| 1,7-Heptanediol | 0.73 |
| 3-Methyl-1,5-pentanediol | 0.54 |
| 1,5-Pentanediol | 0.41 |
| Trimethylolpropane | 0.31 |
| Ethyleneurea | 0.30 |
| 1,2,6-Hexanetriol | 0.28 |
| 1,2,3-Butanetriol | 0.22 |
| Sorbitol | 0.21 |
| Urea | 0.20 |
| Diethylene glycol | 0.15 |
| 1,2,4-Butanetriol | 0.15 |
| Glycerol | 0.11 |
| Diglycerol | 0.08 |

TABLE 1-continued

| Material name | Coefficient of hydrophilicity-hydrophobicity |
|---|---|
| Triethylene glycol | 0.07 |
| Polyethylene glycol 200*1 | −0.09 |
| Polyethylene glycol 600*2 | −0.43 |

*1Polyethylene glycol having a number average molecular weight of 200
*2Polyethylene glycol having a number average molecular weight of 600

Trimethylolpropane and glycols of hydrocarbons having 4 to 7 carbon atoms are favorable as the water-soluble organic compound having a coefficient of hydrophilicity-hydrophobicity of 0.26 or more. In addition, glycols of hydrocarbons having 4 to 7 carbon atoms are favorable as the water-soluble organic compound having a coefficient of hydrophilicity-hydrophobicity of 0.37 or more. Among these, 1,2-hexanediol and 1,6-hexanediol are more favorable.

Salt

The ink according to the present invention may contain a salt. In the present invention, the term "salt" means a compound in which an anion and a cation are ionically bonded to each other. In the present invention, the salt may also be present in the ink in such a state that a part or the whole thereof has been dissociated. It is expressed as "containing a salt" including the situations that the salt is present in the dissociated state. As the salt, may be mentioned an organic acid salt or an inorganic acid salt. As specific examples of the organic acid salt, may be mentioned salts of alkylcarboxylic acids such as citric acid, succinic acid, formic acid, acetic acid, propionic acid, oxalic acid, tartaric acid, gluconic acid, tartronic acid, maleic acid, malonic acid and adipic acid; arylcarboxylic acids such as benzoic acid, phthalic acid and trimellitic acid; and alkylsulfonic acids such as methanesulfonic acid and ethanesulfonic acid. As specific examples of the inorganic acid salt, may be mentioned salts of hydrochloric acid, nitric acid, sulfuric acid, carbonic acid and phosphoric acid.

Incidentally, the content of the salt is favorably 0.1% by mass or more and 10.0% by mass or less, more favorably 0.1% by mass or more and 7.0% by mass or less, particularly favorably 0.2% by mass or more and 5.0% by mass or less, based on the total mass of the ink.

Surfactant

The ink according to the present invention favorably further contains a surfactant. The surfactant is contained, whereby the ejection stability of the ink is improved. Among surfactants, a nonionic surfactant is favorably used. Among nonionic surfactants, polyoxyethylene alkyl ethers and ethylene oxide adducts of acetylene glycol are particularly favorable. The HLB (hydrophile-lipophile balance) values of these nonionic surfactants are favorably 10 or more. The content of the surfactant is favorably 0.1% by mass or more, more favorably 0.2% by mass or more, particularly favorably 0.3% by mass or more. The content is favorably 5.0% by mass or less, more favorably 4.0% by mass or less, particularly favorably 3.0% by mass or less.

Other Additives

Other components than the above-described components may be contained as additives in the ink according to the present invention as needed for the purpose of suitably adjusting the physical property values of the ink. As specific examples of such additives, may be mentioned a pH adjustor, a viscosity modifier, an antifoaming agent, a preservative, a mildew-proofing agent, an antioxidant and a penetrant.

Surface Tension

The surface tension of the ink according to the present invention is favorably 34 mN/m or less, more favorably 32 mN/m or less, particularly favorably 30 mN/m or less. If the surface tension of the ink exceeds 34 mN/m, the permeation rate of an ink into a recording medium may be lowered in some cases to lower the fixability of the ink and the optical density of a resulting image. Incidentally, in the present invention, the surface tension of an ink is a value measured by a vertical plate method using an apparatus such as "CBVP-Z" (manufactured by Kyowa Interface Science Co., Ltd.).

Ink Jet Recording Method:

The ink jet recording method (hereinafter also referred to as "recording method" merely) according to the present invention will now be described. The recording method according to the present invention is a method that an ink is applied to a recording medium from a recording head to record an image, and the above-described ink is used as the ink. The ink jet image-recording method according to the present invention will now be described taking such an ink jet system that the application of an ink is made on demand as an example. However, the recording method of the present invention is not limited to such a system.

In the recording method according to the present invention, the amount of an ink droplet applied to a recording medium from an ejection orifice is favorably controlled to 0.5 µL or more and 6.0 µL or less. Incidentally, the amount of the ink droplet is favorably 1.0 µL or more, more favorably 1.5 µL or more. In addition, the amount of the ink droplet is favorably 5.0 µL or less, more favorably 4.5 µL of less. If the amount of the ink droplet is less than 0.5 µL, a sufficient optical density may not be achieved in some cases. If the amount of the ink droplet exceeds 6.0 µL on the other hand, characters printed may be blocked up by dot gain in some cases when small characters of the order of from the 2-point (1 point ≈0.35 mm) to 5-point are printed.

In the recording method according to the present invention, no particular limitation is imposed on a method for ejecting the ink. As specific examples of the method for ejecting the ink, may be mentioned a method of ejecting an ink by deformation of a piezoelectric element provided within a flow path or by applying a pressure to the ink by a pump. In addition, publicly known ejection methods such as a system in which thermal energy is applied to an ink to generate a bubble and such an electrostatic suction system that an ink is charged to utilize the electrostatic suction force thereof.

EXAMPLES

The present invention will hereinafter be described more specifically by the following Examples and Comparative Examples. Incidentally, "parts" or "part" and "%" in the following are based on mass unless expressly noted.

(1) Preparation of Ink

Preparation of Anionic Self-Dispersible Pigment A

After 10 g of a carbon black having a specific surface area of 320 $m^2/g$ and a DBP oil absorption of 110 mL/100 g and 3.2 g of 4-aminobenzenephosphonic acid were fully mixed with 70 g of water, 1.62 g of nitric acid was added dropwise to the resultant mixture, and the mixture was stirred at 70° C. After several minutes, an aqueous solution with 1 g of sodium nitrite dissolved in 5 g of water was added, and stirring was conducted for additional 1 hour to obtain a slurry. The resultant slurry was filtered through a paper filter (trade name: Toyo Paper Filter No. 2; product of Advantec Co., Ltd.) to separate a pigment particle. The resultant pigment particle was fully washed with water and dried in an oven controlled to 90° C. An anionic self-dispersible pigment A (hereinafter referred to as "Pigment A") with benzenephosphonic acid introduced into the surface of the carbon black was thereby obtained.

Preparation of Anionic Self-Dispersible Pigment B

An anionic self-dispersible pigment B (hereinafter referred to as "Pigment B") was obtained in the same manner as in the case of the above-described Pigment A except that C.I. Pigment Yellow 74 was used in place of the carbon black.

Preparation of Anionic Self-Dispersible Pigment C

An anionic self-dispersible pigment C (hereinafter referred to as "Pigment C") was obtained in the same manner as in the case of the above-described Pigment A except that C.I. Pigment Red 122 was used in place of the carbon black.

Preparation of anionic self-dispersible pigment D

An anionic self-dispersible pigment D (hereinafter referred to as "Pigment D") was obtained in the same manner as in the case of the above-described Pigment A except that C.I. Pigment Blue 15:3 was used in place of the carbon black.

Preparation of Polymer-Dispersed Pigment Dispersion E

Ten grams of a carbon black having a specific surface area of 320 $m^2/g$ and a DBP oil absorption of 110 mL/100 g and 10 g of a styrene-acrylic acid copolymer (styrene/acrylic acid=3/1 (mass ratio)) having a weight average molecular weight of 10,000 were added into 200 mL of THF. The carbon black and the styrene-acrylic acid copolymer were dispersed in THF by conducting stirring to obtain a dispersion liquid. Into the resultant dispersion liquid was added dropwise 400 mL of an aqueous solution (0.2N) of KOH, thereby subjecting the dispersion liquid to phase inversion while gradually dissociating the acrylic acid. The thus-treated dispersion liquid was then subjected to ultrafiltration and concentrated while removing the excessive KOH, thereby obtaining a polymer-dispersed pigment dispersion E (hereinafter referred to as "Pigment Dispersion E") having a solid content of 7.5% (pigment content: 3.75%; polymer content: 3.75%).

(2) Preparation of Polymer Particle Dispersion

Preparation of Polymer Particle Dispersion A

Styrene/n-butyl acrylate/acrylic acid/diacetone acrylamide/sodium dodecyl sulfate were used as monomers and an emulsifier at a mass ratio of 5/12/3/1/0.05 to conduct polymerization. Thereafter, purification and concentration were conducted, thereby obtaining a polymer particle dispersion A having a polymer content of 10%. The glass transition temperature of the polymer forming the polymer particle contained in the resultant polymer pigment dispersion A was −8° C.

Preparation of Polymer Particle Dispersion B

Polymerization was conducted in the same manner as in the case of the above-described polymer pigment dispersion A except that styrene/n-butyl acrylate/acrylic acid/diacetone acrylamide/sodium dodecyl sulfate were used as monomers and an emulsifier at a mass ratio of 3/12/3/3/0.05. Thereafter, purification and concentration were conducted, thereby obtaining a polymer particle dispersion B having a polymer content of 10%. The glass transition temperature of the polymer forming the polymer particle contained in the resultant polymer pigment dispersion B was −10° C.

Preparation of Polymer Particle Dispersion C

Polymerization was conducted in the same manner as in the case of the above-described polymer pigment dispersion A except that styrene/n-butyl acrylate/acrylic acid/sodium dodecyl sulfate were used as monomers and an emulsifier at a mass ratio of 6/12/3/0.05. Thereafter, purification and concentration were conducted, thereby obtaining a polymer particle dispersion C having a polymer content of 10%. The glass transition temperature of the polymer forming the polymer particle contained in the resultant polymer pigment dispersion C was −2° C.

Preparation of Polymer Particle Dispersion D

Polymerization was conducted in the same manner as in the case of the above-described polymer pigment dispersion A except that styrene/acrylic acid/diacetone acrylamide/sodium dodecyl sulfate were used as monomers and an emulsifier at a mass ratio of 11/3/1/0.05. Thereafter, purification and concentration were conducted, thereby obtaining a polymer particle dispersion D having a polymer content of 10%. The glass transition temperature of the polymer forming the polymer particle contained in the resultant polymer pigment dispersion D was 98° C.

Preparation of Polymer Particle Dispersion E

Polymerization was conducted in the same manner as in the case of the above-described polymer pigment dispersion A except that styrene/n-butyl acrylate/acrylic acid/ethyl vinyl ketone/sodium dodecyl sulfate were used as monomers and an emulsifier at a mass ratio of 5/12/3/1/0.05. Thereafter, purification and concentration were conducted, thereby obtaining a polymer particle dispersion E having a polymer content of 10%. The glass transition temperature of the polymer forming the polymer particle contained in the resultant polymer pigment dispersion E was −10° C.

Preparation of Polymer Particle Dispersion F

A four-necked flask equipped with a stirring rod, a reflux condenser, a dropping funnel and a nitrogen inlet tube was charged with 20 g of trimethylolpropane, 200 mL of DMSO (dimethyl sulfoxide) and 2 g of acetic acid, and the contents were heated to 70° C. with stirring. Diketene was then added dropwise in an amount of 0.3 equivalent with respect to a hydroxyl group, and the resultant mixture was stirred for 4 hours. Thereafter, the solvent was removed under reduced pressure, thereby obtaining partially acetoacetylated trimethylolpropane.

Twenty grams of the partially acetoacetylated trimethylolpropane was placed in a four-necked flask equipped with a stirring rod, a reflux condenser, a dropping funnel and a nitrogen inlet tube. In addition, 10 g of 2,2-dimethylolpropionic acid, 16 g of hexamethylene diisocyanate, 24 g of 4,4-dicyclohexylmethane diisocyanate and 300 mL of DMSO were added, and the resultant mixture was heated and stirred for 8 hours at 120° C. The reaction mixture was poured into 2 L of water, and a urethane polymer precipitated was separated by filtration. The urethane polymer separated by filtration was emulsified and dispersed in an aqueous ammonia solution by means of a precision emulsifying and dispersing machine (trade name "CLEARMIX", manufactured by M Technique Co., Ltd.). Thereafter, ultrafiltration was conducted to separate excessive ammonia and concentrate the dispersion liquid, thereby obtaining a polymer particle dispersion F having a polymer content of 8%.

(3) Synthesis of Polyacrylic Acid Hydrazide

Into a mixture of 10 g of polyacrylamide and 20 mL of water was added 7.0 g of hydrazide monohydrate, and the resultant mixture was stirred for 14 hours at 50° C.: This mixture was then added dropwise into 400 mL of methanol, and white precipitate formed was separated by filtration. The white precipitate separated by filtration was dried to obtain polyacrylic acid hydrazide. The hydrozidation rate of the resultant polyacrylic acid hydrazide as calculated by NMR was 50%.

(4) Examples 1 to 19 and Comparative Examples 1 to 11 (Preparation of Inks 1 to 30)

After respective components constituting inks were mixed according to their corresponding formulations (100 parts in total) shown in Table 2, the resultant mixtures were stirred for 1 hour. The mixtures were filtered through a filter having a pore size of 2.5 μm, thereby obtaining inks 1 to 30 (Examples 1 to 19 and Comparative Examples 1 to 11). Each polymer particle was neutralized with a pH adjustor (KOH).

In Table 2, "ACETYLENOL EH" is a trade name (product of Kawaken Fine Chemicals Co., Ltd.) of a nonionic surfactant, and "BONJET CW-2" is a trade name (product of Orient Chemical Industries Ltd.) of a self-dispersible pigment. In Table 2, "TMP", "12HD", "16HD", "Gly", "DEG" and "IPA" mean trimethylolpropane, 1,2-hexanediol, 1,6-hexanediol, glycerol, diethylene glycol and isopropanol, respectively.

TABLE 2

| | | | Pigment | | Polymer particle | | Crosslinking agent | | Water-soluble |
|---|---|---|---|---|---|---|---|---|---|
| | | | Kind of pigment or pigment | Content of pigment in ink | Kind of polymer particle dispersion | Content of polymer particle in ink | Kind of functional | Number of functional | compound (parts) |
| | | Ink | dispersion | (parts) | (RPD) | (parts) | group | groups *1 | TMP |
| Example | 1 | 1 | Pigment A | 4.0 | RPD A | 4.0 | Adipic dihydrazide | 1.0 | 5.0 |
| | 2 | 2 | BONJET CW-2 | 4.0 | RPD A | 4.0 | Adipic dihydrazide | 1.0 | 5.0 |
| | 3 | 3 | Pigment A | 4.0 | RPD B | 4.0 | Adipic dihydrazide | 1.0 | 5.0 |
| | 4 | 4 | Pigment A | 4.0 | RPD A | 4.0 | Adipic dihydrazide | 1.0 | 0 |
| | 5 | 5 | Pigment A | 4.0 | RPD A | 4.0 | Isophthalic dihydrazide | 1.0 | 5.0 |
| | 6 | 6 | Pigment A | 2.0 | RPD B | 4.0 | Adipic dihydrazide | 1.0 | 5.0 |
| | 7 | 7 | Pigment A | 1.0 | RPD B | 5.0 | Adipic dihydrazide | 1.0 | 5.0 |
| | 8 | 8 | Pigment A | 4.0 | RPD A | 4.0 | Adipic semicarbazide | 1.0 | 5.0 |

TABLE 2-continued

|  |  |  |  |  |  |  |  |  |
|---|---|---|---|---|---|---|---|---|
|  | 9 | 9 | Pigment A | 4.0 | RPD A | 4.0 | Polyacrylic acid hydrazide | 1.5 | 5.0 |
|  | 10 | 10 | Pigment dispersion E | 4.0 | RPD A | 4.0 | Adipic dihydrazide | 1.0 | 5.0 |
|  | 11 | 11 | Pigment A | 4.0 | RPD A | 4.0 | Adipic dihydrazide | 1.0 | 5.0 |
|  | 12 | 12 | Pigment A | 4.0 | RPD A | 4.0 | Adipic dihydrazide | 1.0 | 5.0 |
|  | 13 | 13 | Pigment A | 4.0 | RPD A | 4.0 | Adipic dihydrazide | 1.0 | 6.0 |
|  | 14 | 14 | Pigment A | 4.0 | RPD A | 4.0 | Adipic dihydrazide | 1.0 | 7.0 |
|  | 15 | 15 | Pigment A | 4.0 | RPD A | 4.0 | Adipic dihydrazide | 1.0 | 8.0 |
|  | 16 | 16 | Pigment A | 4.0 | RPD A | 4.0 | Adipic dihydrazide | 0.5 | 5.0 |
|  | 17 | 17 | Pigment B | 4.0 | RPD A | 4.0 | Adipic dihydrazide | 1.0 | 5.0 |
|  | 18 | 18 | Pigment C | 4.0 | RPD A | 4.0 | Adipic dihydrazide | 1.0 | 5.0 |
|  | 19 | 19 | Pigment D | 4.0 | RPD A | 4.0 | Adipic dihydrazide | 1.0 | 5.0 |
| Comparative Example | 1 | 20 | Pigment A | 4.0 | Not used | 0 | Not used | 0 | 5.0 |
|  | 2 | 21 | Pigment A | 4.0 | RPD C | 4.0 | Adipic dihydrazide | 1.0 | 5.0 |
|  | 3 | 22 | Pigment A | 4.0 | RPD A | 4.0 | Not used | 0 | 5.0 |
|  | 4 | 23 | Pigment A | 4.0 | RPD A | 1.5 | Adipic dihydrazide | 1.0 | 5.0 |
|  | 5 | 23 | Pigment A | 1.8 | RPD A | 9.5 | Adipic dihydrazide | 1.0 | 5.0 |
|  | 6 | 25 | Pigment A | 4.0 | RPD D | 4.0 | Adipic dihydrazide | 1.0 | 5.0 |
|  | 7 | 26 | Pigment A | 4.0 | RPD E | 4.0 | Adipic dihydrazide | 1.0 | 5.0 |
|  | 8 | 27 | Pigment B | 4.0 | RPD C | 4.0 | Adipic dihydrazide | 1.0 | 5.0 |
|  | 9 | 28 | Pigment C | 4.0 | RPD C | 4.0 | Adipic dihydrazide | 1.0 | 5.0 |
|  | 10 | 29 | Pigment D | 4.0 | RPD C | 4.0 | Adipic dihydrazide | 1.0 | 5.0 |
|  | 11 | 30 | Pigment A | 4.0 | RPD F | 4.0 | Adipic dihydrazide | 1.0 | 5.0 |

|  |  | Water-soluble compound (parts) | | | Salt Potassium phthalate (parts) | Surfactant ACETYL-ENOL EH (parts) | pH adjustor | Ion-exchanged water |
|---|---|---|---|---|---|---|---|---|
|  |  | 12HD | 16HD | IPA |  |  |  |  |
| Example | 1 | 15.0 | 0 | 0.5 | 0.5 | 1.0 | KOH | Balance |
|  | 2 | 15.0 | 0 | 0.5 | 0.5 | 1.0 | KOH | Balance |
|  | 3 | 10.0 | 5.0 | 0.5 | 0.5 | 1.0 | KOH | Balance |
|  | 4 | 10.0 | 10.0 | 0.5 | 0.5 | 1.0 | KOH | Balance |
|  | 5 | 15.0 | 0 | 0.5 | 0.5 | 1.0 | KOH | Balance |
|  | 6 | 15.0 | 0 | 0.5 | 0.5 | 1.0 | KOH | Balance |
|  | 7 | 15.0 | 0 | 0.5 | 0.5 | 1.0 | KOH | Balance |
|  | 8 | 15.0 | 0 | 0.5 | 0.5 | 1.0 | KOH | Balance |
|  | 9 | 15.0 | 0 | 0.5 | 0.5 | 1.0 | KOH | Balance |
|  | 10 | 15.0 | 0 | 0.5 | 0.5 | 1.0 | KOH | Balance |
|  | 11 | 15.0 | 0 | 0.5 | 0 | 1.0 | KOH | Balance |
|  | 12 | 15.0 | 0 | 0.5 | 0.5 | 0 | KOH | Balance |
|  | 13 | 14.0 | 0 | 0.5 | 0.5 | 1.0 | KOH | Balance |
|  | 14 | 13.0 | 0 | 0.5 | 0.5 | 1.0 | KOH | Balance |
|  | 15 | 12.0 | 0 | 0.5 | 0.5 | 1.0 | KOH | Balance |
|  | 16 | 15.0 | 0 | 0.5 | 0.5 | 1.0 | KOH | Balance |
|  | 17 | 15.0 | 0 | 0.5 | 0.5 | 1.0 | KOH | Balance |
|  | 18 | 15.0 | 0 | 0.5 | 0.5 | 1.0 | KOH | Balance |
|  | 19 | 15.0 | 0 | 0.5 | 0.5 | 1.0 | KOH | Balance |
| Comparative Example | 1 | 15.0 | 0 | 0.5 | 0.5 | 1.0 | KOH | Balance |
|  | 2 | 15.0 | 0 | 0.5 | 0.5 | 1.0 | KOH | Balance |
|  | 3 | 15.0 | 0 | 0.5 | 0.5 | 1.0 | KOH | Balance |
|  | 4 | 15.0 | 0 | 0.5 | 0.5 | 1.0 | KOH | Balance |
|  | 5 | 15.0 | 0 | 0.5 | 0.5 | 1.0 | KOH | Balance |
|  | 6 | 15.0 | 0 | 0.5 | 0.5 | 0 | KOH | Balance |
|  | 7 | 15.0 | 0 | 0.5 | 0.5 | 1.0 | KOH | Balance |

TABLE 2-continued

| | | | | | | | |
|---|---|---|---|---|---|---|---|
| 8 | 15.0 | 0 | 0.5 | 0.5 | 1.0 | KOH | Balance |
| 9 | 15.0 | 0 | 0.5 | 0.5 | 1.0 | KOH | Balance |
| 10 | 15.0 | 0 | 0.5 | 0.5 | 1.0 | KOH | Balance |
| 11 | 15.0 | 0 | 0.5 | 0.5 | 1.0 | KOH | Balance |

[1] the number of functional groups of the crosslinking agent to form the crosslinked structure per one ketone group of the polymer particle.

(5) Examples 20 to 38 and Comparative Examples 12 to 22

Recording of Image

An image was recorded with each of the inks prepared in Examples 1 to 19 and Comparative Examples 1 to 11. Specifically, each ink was loaded in an ink head part of an ink jet recording apparatus (trade name "V630", manufactured by Seiko Epson Corp.) to record a line image and a solid image on a recording medium. Incidentally, the following paper sheets (a) to (d) were used as recording media. The images formed were evaluated with an average of the images recorded on the respective paper sheets.
(a) Plain paper (PPC/BJ common paper): "Office Planner Paper" (product of Canon Marketing Japan Inc.) and "GF-500" (product of Canon Marketing Japan Inc.),
(b) Paper for photography: "PR-201" (product of Canon Marketing Japan Inc.),
(c) Non-coated printing paper: "OK Woodfree EF" and "OK Woodfree Paper" (products of Oji Paper Co., Ltd.)
(d) Coated printing paper: "OK Planus White", "OK Topcoat Plus" and "OK KINFUJI" (products of Oji Paper Co., Ltd.)

(6) Evaluation

Ejection Stability

The above-described ink jet recording apparatus was used to print a solid image of 100% duty on each paper. The resultant print (image) was observed to evaluate each ink as to ejection stability according to the following criteria. Evaluation results are shown in Table 3.
5: Printing is made without causing a problem;
4: A portion where no printing is made (blur) is observed;
3: A portion where no printing is made (blur) is markedly observed;
2: Printing can be scarcely made; and
1: Printing cannot be made.

Blurring Resistance

The above-described ink jet recording apparatus was used to print a line on each paper sheet. The resultant print (image) was observed to evaluate each ink as to blurring resistance according to the following criteria. Evaluation results are shown in Table 3.
5: Blurring is scarcely observed on the print;
3: Blurring is slightly observed on the print; and
1: Blurring is observed on the print.

Scratch Resistance

The print (image) formed with the ink of each hue was reciprocatingly rubbed 20 times by hand with Silbon paper. Thereafter, the print (image) was observed to evaluate the ink as to scratch resistance of the image according to the following criteria. Evaluation results are shown in Table 3.
5: Occurrence of a blank portion is not observed on the print;
3: Occurrence of a blank portion is slightly observed on the print; and
1: Occurrence of a blank portion is markedly observed on the print.

Water Resistance

After water was sprayed on the print (image) formed with the ink of each hue, the print was reciprocatingly rubbed once by hand with Silbon paper. Thereafter, the print (image) was observed to evaluate the ink as to water resistance of the image according to the following criteria. Evaluation results are shown in Table 3.
5: Occurrence of a blank portion is not observed on the print;
3: Occurrence of a blank portion is slightly observed on the print; and
1: Occurrence of a blank portion is markedly observed on the print.

TABLE 3

| | Ink | Surface tension (mN/m) | Ejection characteristics | Blurring resistance | Scratch resistance | Water resistance |
|---|---|---|---|---|---|---|
| Ex. 20 | 1 | 30 | 5 | 5 | 5 | 5 |
| Ex. 21 | 2 | 32 | 5 | 5 | 5 | 5 |
| Ex. 22 | 3 | 31 | 5 | 5 | 5 | 5 |
| Ex. 23 | 4 | 32 | 5 | 5 | 5 | 5 |
| Ex. 24 | 5 | 31 | 5 | 5 | 5 | 5 |
| Ex. 25 | 6 | 32 | 5 | 5 | 5 | 5 |
| Ex. 26 | 7 | 32 | 4 | 5 | 5 | 5 |
| Ex. 27 | 8 | 32 | 5 | 5 | 5 | 5 |
| Ex. 28 | 9 | 32 | 4 | 5 | 5 | 5 |
| Ex. 29 | 10 | 33 | 4 | 5 | 5 | 5 |
| Ex. 30 | 11 | 32 | 5 | 5 | 5 | 5 |
| Ex. 31 | 12 | 35 | 5 | 5 | 5 | 5 |
| Ex. 32 | 13 | 32 | 5 | 4 | 4 | 4 |
| Ex. 33 | 14 | 32 | 5 | 4 | 4 | 4 |
| Ex. 34 | 15 | 32 | 5 | 4 | 4 | 4 |
| Ex. 35 | 16 | 32 | 5 | 4 | 4 | 4 |
| Ex. 36 | 17 | 32 | 5 | 5 | 5 | 5 |
| Ex. 37 | 18 | 32 | 5 | 5 | 5 | 5 |
| Ex. 38 | 19 | 32 | 5 | 5 | 5 | 5 |
| Comp. Ex. 12 | 20 | 32 | 5 | 5 | 1 | 1 |
| Comp. Ex. 13 | 21 | 30 | 5 | 5 | 4 | 3 |
| Comp. Ex. 14 | 22 | 31 | 5 | 5 | 4 | 3 |
| Comp. Ex. 15 | 23 | 31 | 5 | 5 | 1 | 1 |
| Comp. Ex. 16 | 24 | 32 | 2 | 5 | 5 | 5 |
| Comp. Ex. 17 | 25 | 35 | 5 | 5 | 1 | 1 |
| Comp. Ex. 18 | 26 | 32 | 4 | 4 | 4 | 3 |
| Comp. Ex. 19 | 27 | 32 | 5 | 5 | 4 | 3 |
| Comp. Ex. 20 | 28 | 32 | 5 | 5 | 4 | 3 |
| Comp. Ex. 21 | 29 | 32 | 5 | 5 | 4 | 3 |
| Comp. Ex. 22 | 30 | 33 | 3 | 3 | 2 | 1 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-130501, filed Jun. 10, 2011, which is hereby incorporated by reference herein in its entirety.

What is claimed is:

1. An ink jet ink comprising a coloring material, a polymer particle, a crosslinking agent and an aqueous medium, wherein:

the polymer particle has a unit derived from a compound represented by a following general formula (I) and a glass transition temperature of 25° C. or less, the crosslinking agent has a functional group capable of forming a crosslinked structure with a ketone group derived from the compound represented by the general formula (1) by a dehydration reaction, and a mass ratio of a content (% by mass) of the coloring material based on the total mass of the ink to a content (% by mass) of the polymer particle based on the total mass of the ink is 0.2 times or more and 2.5 times or less, General formula (1)

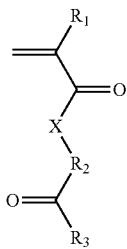

wherein $R_1$ is H or $CH_3$, X is O or NH, $R_2$ is an alkylene group having 1 to 10 carbon atoms or an aromatic ring structure having 1 to 10 carbon atoms, and $R_3$ is an alkyl group having 1 to 10 carbon atoms or an aromatic ring structure having 1 to 10 carbon atoms.

2. The ink jet ink according to claim 1, wherein the functional group of the crosslinking agent to form the crosslinked structure is at least one of a hydrazide group and a semicarbazide group, and wherein the crosslinking agent has two or more hydrazide groups and semicarbazide groups.

3. The ink jet ink according to claim 1, wherein the coloring material is a pigment.

4. The ink jet ink according to claim 3, wherein the pigment is an anionic self-dispersible pigment.

5. The ink jet ink according to claim 1, wherein the aqueous medium contains a water-soluble organic compound having a coefficient of hydrophilicity-hydrophobicity of 0.26 or more, the coefficient of hydrophilicity-hydrophobicity being defined by the following equation (A):

Coefficient of hydrophilicity-hydrophobicity=[(Water activity of a 20% aqueous solution)−(Molar fraction of water in the 20% aqueous solution)]/[1−(Molar fraction of water in the 20% aqueous solution)]     Equation (A).

6. The ink jet ink according to claim 1, wherein a surface tension of the ink is 34 mN/m or less.

7. An ink jet recording method comprising applying an ink to a recording medium from a recording head to record an image, wherein the ink is the ink jet ink according to claim 1.

* * * * *